United States Patent
Sullivan et al.

(10) Patent No.: US 8,465,573 B2
(45) Date of Patent: Jun. 18, 2013

(54) SYSTEM AND METHOD FOR CONDITIONING AIR FLOW TO A GAS TURBINE

(75) Inventors: Michael Adelbert Sullivan, Woodstock, GA (US); Huong Van Vu, Duluth, GA (US); Bhalchandra Arun Desai, Smyrna, GA (US); Eric M. Lafontaine, Atlanta, GA (US); Mark Andrew Cournoyer, Coventry, RI (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 13/253,273

(22) Filed: Oct. 5, 2011

(65) Prior Publication Data
US 2013/0087045 A1    Apr. 11, 2013

(51) Int. Cl.
*B01D 46/00*    (2006.01)
(52) U.S. Cl.
USPC .............. 95/273; 55/323; 55/355; 55/482.1; 55/485; 55/479; 55/385.1; 55/495; 55/529
(58) Field of Classification Search
USPC ............... 55/322, 323, 355, 482.1, 485, 479, 55/482, 486, 529; 95/283, 287
See application file for complete search history.

(56) References Cited

U.S. PATENT DOCUMENTS

| | | | |
|---|---|---|---|
| 7,513,923 B1 * | 4/2009 | Lewis et al. | 55/385.6 |
| 7,648,564 B2 | 1/2010 | Chillar et al. | |
| 7,963,095 B2 | 6/2011 | Chillar et al. | |
| 2010/0050873 A1 * | 3/2010 | Hiner et al. | 95/283 |
| 2010/0054919 A1 * | 3/2010 | Hiner et al. | 415/121.2 |
| 2010/0251681 A1 * | 10/2010 | Gebert | 55/495 |
| 2011/0048236 A1 * | 3/2011 | Lamee | 95/280 |
| 2011/0315015 A1 * | 12/2011 | Jarrier et al. | 95/280 |
| 2012/0079798 A1 * | 4/2012 | Rafi et al. | 55/484 |
| 2012/0132075 A1 * | 5/2012 | Jarrier et al. | 95/268 |
| 2012/0204525 A1 * | 8/2012 | Jarrier | 55/385.7 |
| 2012/0255268 A1 * | 10/2012 | Nicholas et al. | 55/445 |
| 2012/0324843 A1 * | 12/2012 | Saraswathi et al. | 55/318 |

* cited by examiner

*Primary Examiner* — Duane Smith
*Assistant Examiner* — Minh-Chau Pham
(74) *Attorney, Agent, or Firm* — Dority & Manning, PA (57) ABSTRACT

A system for conditioning air flow to a gas turbine includes a filter housing and a conditioning media inside the filter housing to adjust the temperature of the air flowing through the filter housing. At least one of a depth or a density of the conditioning media varies across the filter housing. A method for conditioning air flow to a gas turbine includes flowing air through a filter housing connected to the gas turbine and flowing the air across a conditioning media in the filter housing. The method further includes conditioning the air flow to reduce the temperature difference of the air exiting the filter housing across a dimension of the filter housing.

20 Claims, 8 Drawing Sheets

SYSTEM AND METHOD FOR CONDITIONING AIR FLOW TO A GAS TURBINE

FIELD OF THE INVENTION

The present invention generally involves a system and method for conditioning air flow to a gas turbine. In particular, various embodiments of the present invention vary at least one of a depth or density of a conditioning media to produce a desired temperature profile of the air flow to the gas turbine.

BACKGROUND OF THE INVENTION

Gas turbines are widely used in industrial and commercial operations. For example, industrial gas turbines typically include one or more combustors to generate power or thrust. A typical commercial gas turbine used to generate electrical power includes a compressor at the front, one or more combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows to the combustors where it mixes with fuel and ignites to generate combustion gases having a high temperature and pressure. The combustion gases flow to the turbine where they expand to produce work. For example, expansion of the combustion gases in the turbine may rotate a shaft connected to a generator to produce electricity.

The physical characteristics of the ambient air entering the compressor significantly affect the efficiency, power output, and performance of the gas turbine. For example, a 1° F. increase in ambient temperature may produce a corresponding 0.3-0.5% decrease in the power output of the gas turbine. Similarly, a change in the humidity of the ambient air inversely affects the density of the ambient air and thus the power output of the gas turbine. As a result, many gas turbines include a system for conditioning the ambient air entering the gas turbine to enhance the efficiency, power output, and/or performance of the gas turbine.

The system for conditioning ambient air flow to the gas turbine may include, for example, one or more stages of filters, cooling media, and/or moisture separators that adjust the cleanliness, temperature, and/or humidity of the ambient air before it enters the gas turbine. Although effective at adjusting the temperature and/or humidity of the ambient air, the physical limitations of the system may create an uneven temperature profile of the ambient air exiting the system and flowing to the gas turbine. The uneven temperature profile of the ambient air may exceed design limitations of the gas turbine and induce temperature stresses in the compressor bellmouth. As a result, a system and method for conditioning ambient air that produce a desired temperature profile of the air to the gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a system for conditioning air flow to a gas turbine that includes a filter housing that defines a cross-section for air flow. A conditioning media inside the filter housing extends radially across the cross-section to adjust the temperature of the air flowing through the filter housing. At least one of a depth or a density of the conditioning media varies across the cross-section of the filter housing.

Another embodiment of the present invention is a system for conditioning air flow to a gas turbine that includes a filter housing that defines a path for air flow to the gas turbine. An inlet to the filter housing defines a first cross-section for air flow into the filter housing. An outlet to the filter housing downstream from the inlet defines a second cross-section for air flow out of the filter housing that is smaller than the first cross-section. A conditioning media extends radially across the filter housing between the inlet and the outlet to adjust the temperature of the air flowing from the inlet to the outlet. At least one of a depth or a density of the conditioning media varies across the filter housing.

The present invention may also include a method for conditioning air flow to a gas turbine that includes flowing air through a filter housing connected to the gas turbine and flowing the air across a conditioning media in the filter housing. The method further includes conditioning the air flow to reduce the temperature difference of the air exiting the filter housing across a dimension of the filter housing.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for conditioning air flow to a gas turbine. In particular embodiments, a filter housing is located upstream from the gas turbine, and a conditioning media in the filter housing adjusts the temperature of the air flowing through the filter housing. A depth and/or a density of the conditioning media changes across the filter housing to produce a desired temperature profile of the air flow downstream to the gas turbine. As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A.

Figure 1:
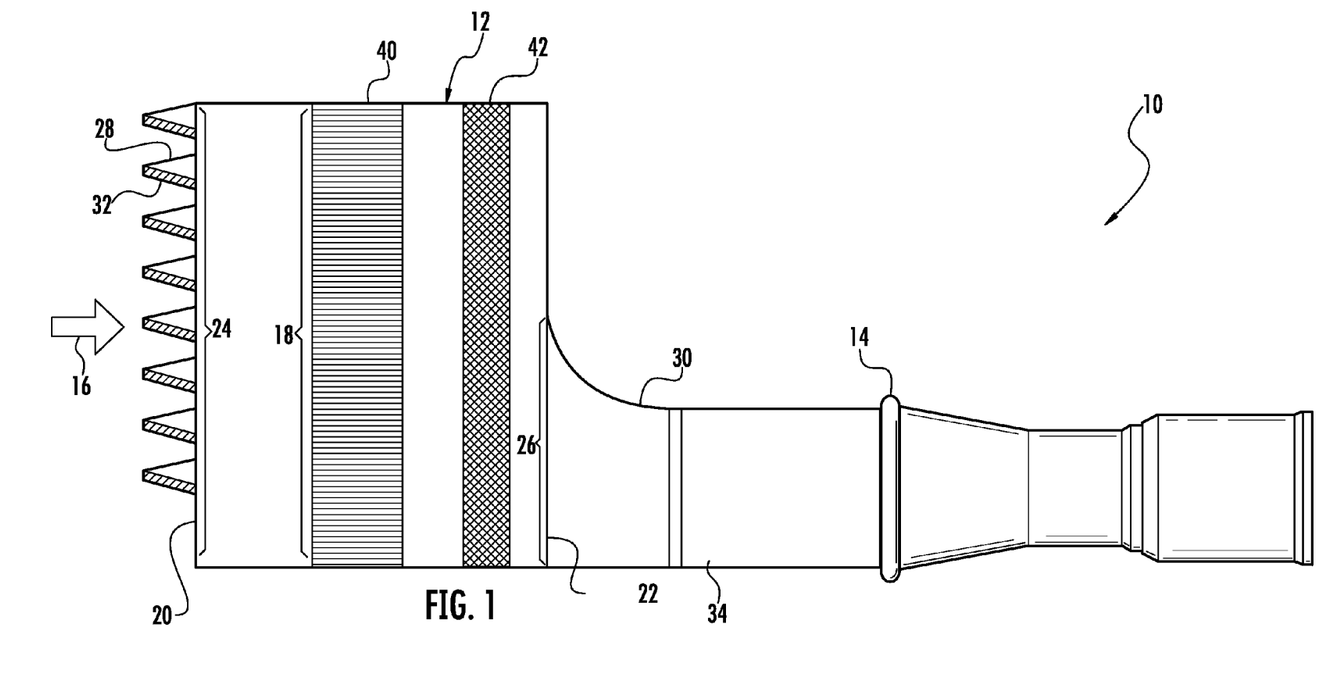
FIG. 1 is a side view of an exemplary system within the scope of various embodiments of the present invention.

FIG. 1 provides a side view of an exemplary system 10 within the scope of various embodiments of the present invention. As shown, the system 10 generally includes a filter housing 12 connected to a gas turbine 14 to condition an air flow 16 to the gas turbine 14. The air flow 16 may derive directly or indirectly from the environment or ambient air in which the system 10 is located, and the filter housing 12 generally defines a cross-section or a path 18 for the air flow 16 to pass through before entering the gas turbine 14. For example, the filter housing 12 may include an inlet 20 and an outlet 22 downstream from the inlet 20. The inlet 20 may define a first cross-section 24 for the air flow 16 into the filter housing 12, and the outlet 22 may define a second cross-section 26 for the air flow 16 out of the filter housing 12.

The filter housing 12 may further include a weather hood 28 connected to the inlet 20 and a transition piece 30 connected to the outlet 22. The weather hood 28 may extend across a portion or all of the inlet 20 and may include one or more moisture separators 32 to prevent elements such as rain, snow, and ice from entering the filter housing 12 to reduce the liquid content of the air flow 16 in the filter housing 12. The transition piece 30 may connect the filter housing 12 to a duct network 34 that ultimately connects to the gas turbine 14. Although FIG. 1 shows the transition piece 30 connected to the bottom portion of the filter housing 12, the transition piece 30 may be connected at other elevations of the filter housing 12 in alternate embodiments. In this manner, the first cross-section 24 of the inlet 20 may be larger than the second cross-section 26 of the outlet 22, and the transition piece 30 may further reduce the second cross-section 26 of the outlet 22 to accelerate the air flow 16 and more closely conform the duct network 34 to the shape of the gas turbine 14 inlet.

As shown in FIG. 1, the system 10 further includes a conditioning media 40 inside the filter housing 12 to adjust the temperature of the air flowing through the filter housing 12. The conditioning media 40 may include one or more devices known to one of ordinary skill in the art for transferring or exchanging heat with a fluid flow. For example, the conditioning media 40 may include a chiller, refrigerant tubes, an evaporative cooler, a spray cooler, or combinations thereof. The conditioning media may extend radially across the cross-section 18 of the filter housing 12 between the inlet 20 and the outlet 22 and may be followed by a moisture separator 42 downstream from the conditioning media to remove additional condensation or water droplets from the air flow 16. In this manner, the air flow 16 may pass through the inlet 20 and flow over the conditioning media 40 to exchange heat with the conditioning media 40 before flowing through the outlet 22.

Figure 2:
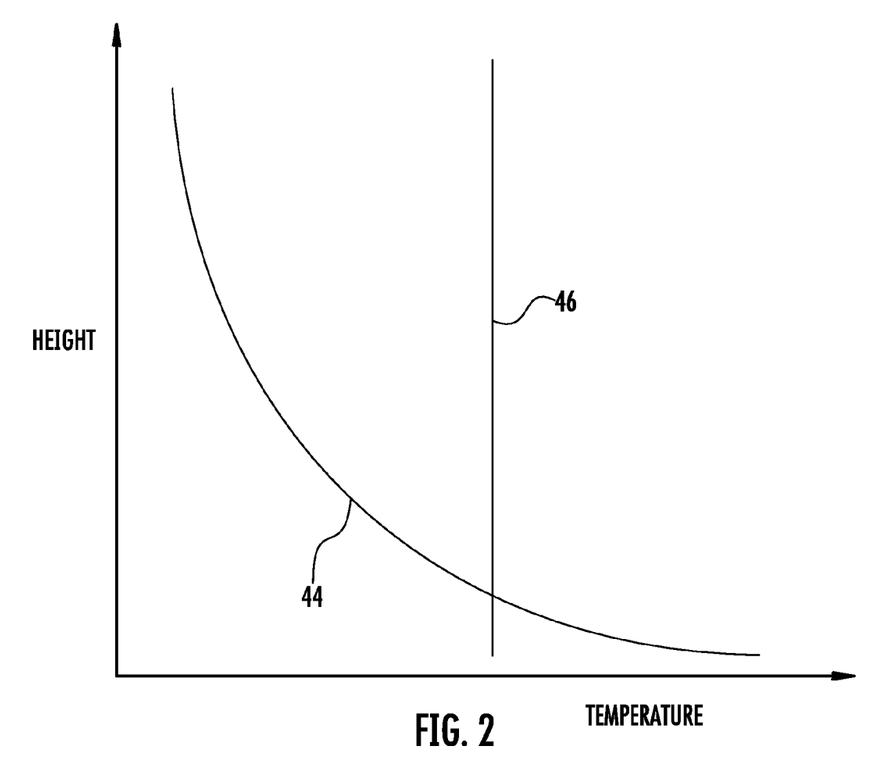
FIG. 2 is an exemplary graph of various air flow temperature profiles.

FIG. 2 provides exemplary graphs of various temperature profiles of air flow 16 exiting the filter housing 12. The horizontal axis reflects the temperature of the air flow 16 exiting the filter housing 12, and the vertical axis reflects the height of the air flow 16 in the outlet 22 or transition piece 30. An exemplary baseline temperature profile 44 of prior art systems shows that the air 16 temperature exiting the filter housing 12 is lowest at the top of the outlet 22 or transition piece 30 and gradually increases towards the bottom of the outlet 22 or transition piece 30. The variation in air 16 temperature is generally caused by the reduction in the cross-section 18 of the filter housing 12 near the outlet 22 and the corresponding increase in the air 16 velocity across the lower portions of the conditioning media 40 proximate to the transition piece 30. The variation in the air 16 velocity and temperature may diminish the benefits sought by conditioning the air flow 16 and/or may exceed the design limits for acceptable variations in air flow 16 temperature entering the gas turbine 14. The embodiments of the present invention do not alter the flow/velocity profile of the ambient air but rather counteract the current temperature profile by supplying thicker or more dense media coincident with higher air velocities such that the region with higher velocity will have a thicker or more dense media and hence lower exit air temperature. The varying depth 50 and/or density 52 of the conditioning media 40 provides increased resistance and/or heat exchange capacity to the air flow 16 to produce a more uniform temperature profile exiting the filter housing 12.

Figure 3:
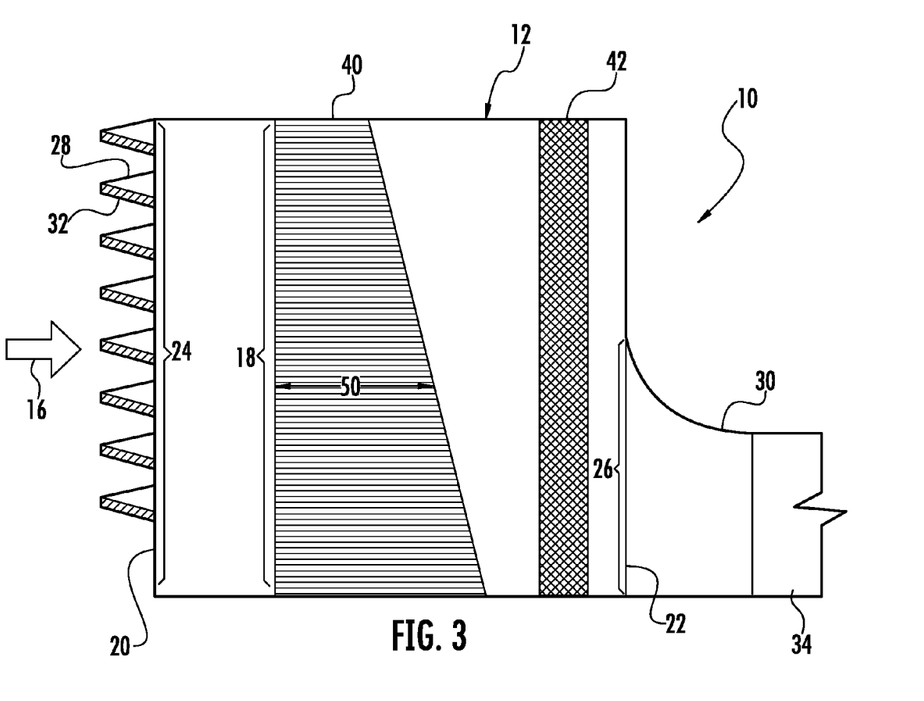
FIG. 3 is a side view of a system according to a first embodiment of the present invention.
Figure 4:
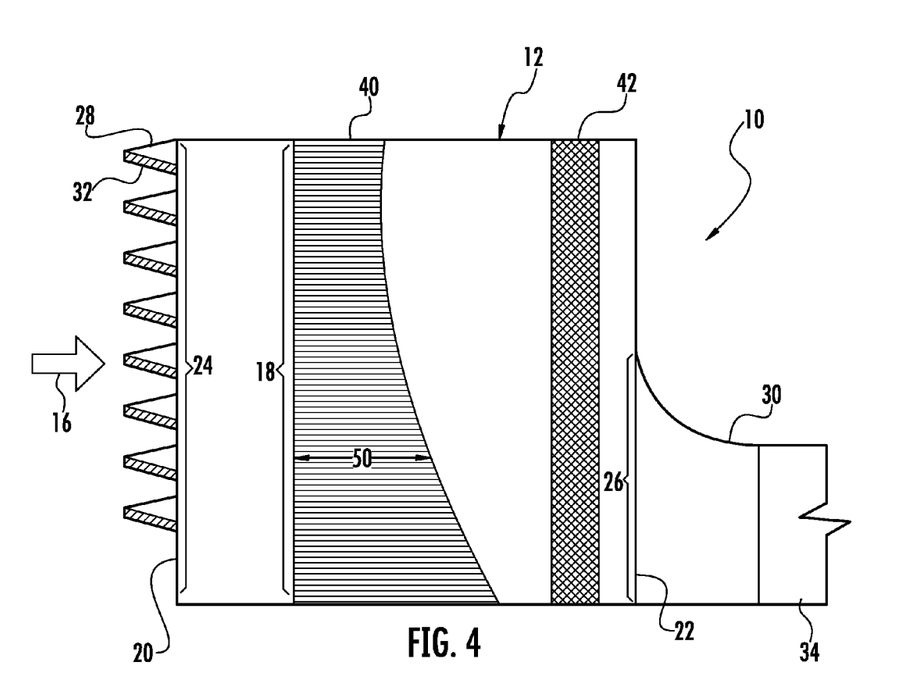
FIG. 4 is a side view of a system according to a second embodiment of the present invention.
Figure 5:
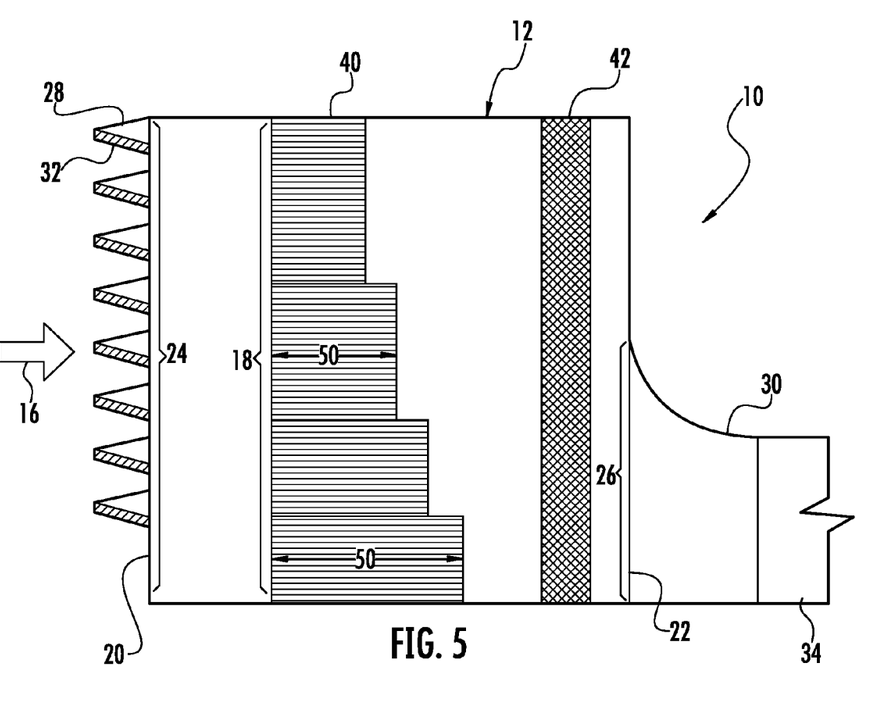
FIG. 5 is a side view of a system according to a third embodiment of the present invention.

FIGS. 3-5 provide side views of the system 10 shown in FIG. 1 in which the depth 50 of the conditioning media 40 varies across the cross-section 18 of the filter housing 12. As shown in FIGS. 3-5, the depth 50 of the conditioning media 40 generally increases proximate to the transition piece 30 to provide additional heat exchange capacity proximate to the area of increased air flow 16. Specifically, the depth 50 of the conditioning media 40 may increase substantially linearly across the cross-section 18 of the filter housing 12, as shown in FIG. 3. In this particular embodiment, the substantially linear increase in the depth 50 of the conditioning media 40 provides a corresponding substantially linear increase in the heat exchange capability proximate to the transition piece 30. Alternately, or in addition, the depth 50 of the conditioning media 40 may increase greater than substantially linearly across the cross-section 18 of the filter housing 12, as shown in FIG. 4, to provide a corresponding greater than linear increase in the heat exchange capability proximate to the transition piece 30. In still further embodiments, the depth 50 of the conditioning media 40 may increase in step changes across the cross-section 18 of the filter housing 12, as shown in FIG. 5. The step changes in the depth 50 of the conditioning media 40 may reflect a modular construction and/or adjustment of the heat exchange capability proximate to the transition piece 30. One of ordinary skill in the art will readily appreciate that various combinations of the embodiments shown in FIGS. 3-5 may lead to still further embodiments, and the present invention is not limited to any particular rate or location of the increase in depth 50 of the conditioning media 40 except as specifically recited in the claims.

Figure 6:
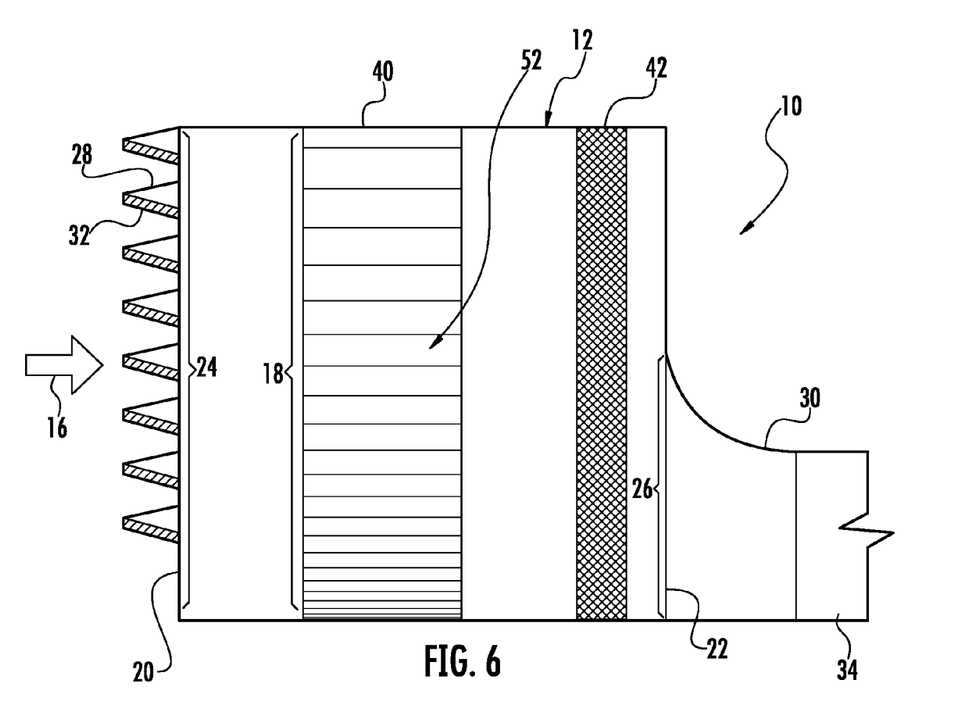
FIG. 6 is a side view of a system according to a fourth embodiment of the present invention.
Figure 7:
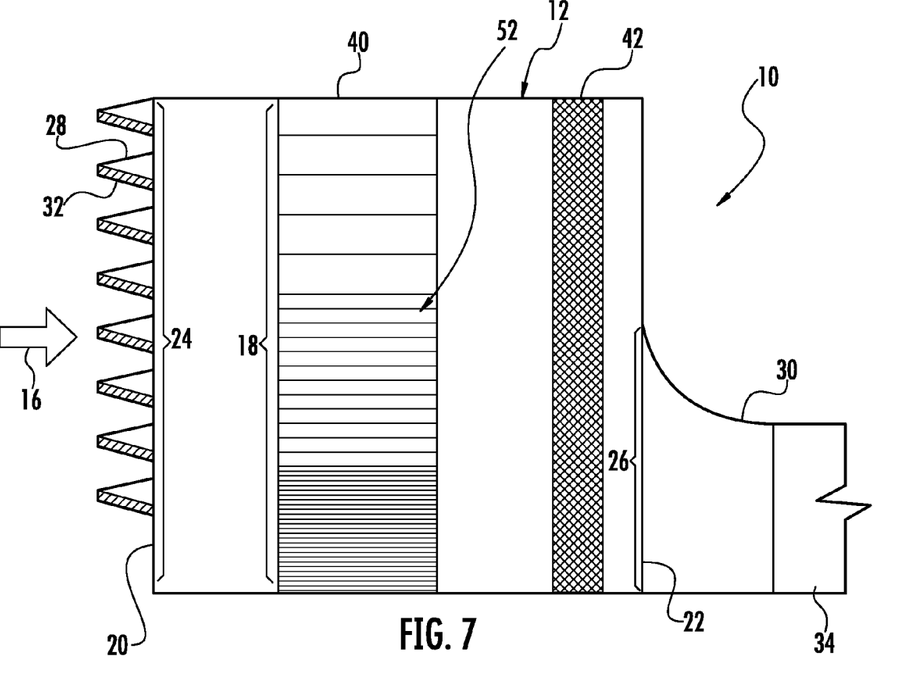
FIG. 7 is a side view of a system according to a fifth embodiment of the present invention.
Figure 8:
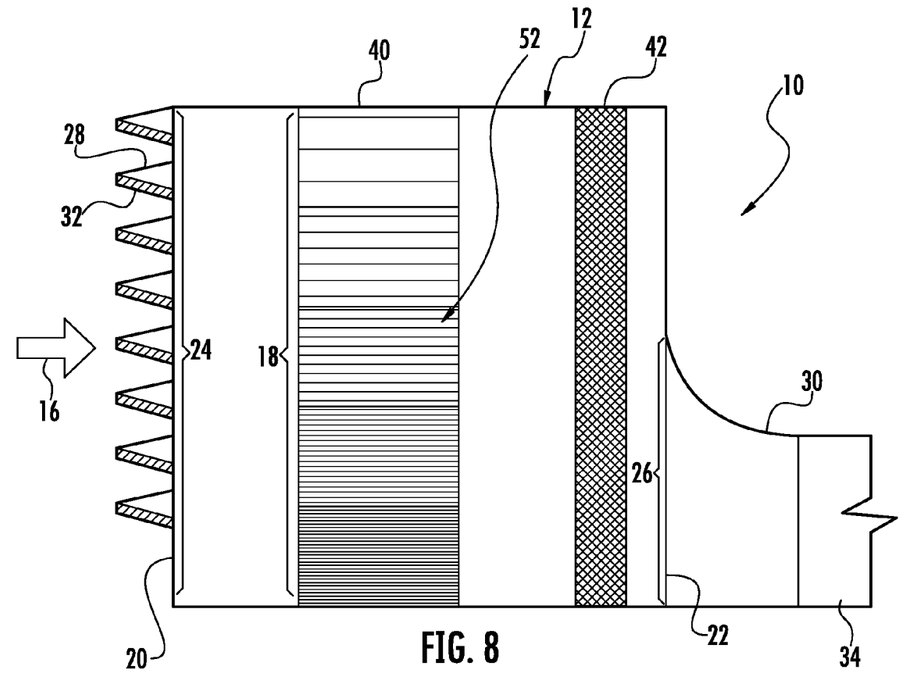
FIG. 8 is a side view of a system according to a sixth embodiment of the present invention.

FIGS. 6-8 similarly provide side views of the system 10 shown in FIG. 1 in which the density 52 of the conditioning media 40 varies across the cross-section 18 of the filter housing 12. As used herein, the density 52 of the conditioning media 40 refers to the heat exchange capability of the conditioning media 40 accomplished by varying the concentration of one or more of the refrigerant, cooling coils, and/or fluid flow per unit area in the conditioning media 40. As shown in FIGS. 6-8, the density 52 of the conditioning media 40 generally increases proximate to the transition piece 30 to provide additional heat exchange capacity proximate to the area of increased air flow 16. Specifically, the density 52 of the conditioning media 40 may increase substantially linearly across the cross-section 18 of the filter housing 12, as shown in FIG. 6. In this particular embodiment, the substantially linear increase in the density 52 of the conditioning media 40 provides a corresponding substantially linear increase in the heat exchange capability proximate to the transition piece 30. Alternately, or in addition, the density 52 of the conditioning media 40 may increase greater than substantially linearly across the cross-section 18 of the filter housing 12, as shown in FIG. 7, to provide a corresponding greater than linear increase in the heat exchange capability proximate to the transition piece 30. In still further embodiments, the density 52 of the conditioning media 40 may increase in step changes across the cross-section 18 of the filter housing 12, as shown in FIG. 8. The step changes in the density 52 of the conditioning media 40 may reflect a modular construction and/or adjustment of the heat exchange capability proximate to the transition piece 30. One of ordinary skill in the art will readily appreciate that various combinations of the embodiments shown in FIGS. 6-8 may lead to still further embodiments, and the present invention is not limited to any particular rate or location of the increase in density 52 of the conditioning media 40 except as specifically recited in the claims.

The various embodiments shown in FIGS. 3-8 may also provide a method for conditioning air flow to the gas turbine 14. The method may include flowing the air 16 through the filter housing 12 connected to the gas turbine 14 and flowing the air 16 across the conditioning media 40 in the filter housing 12. The method may further include conditioning the air flow to reduce the temperature difference of the air 16 exiting the filter housing 12 across a dimension of the filter housing 12. In particular embodiments, the conditioning may include flowing the air 16 across at least one of a varying depth 50 or a varying density 52 of the conditioning media 40 to produce a desired temperature profile of the air flow 16 to the gas turbine 14. For example, the method may include increasing at least one of the depth 50 or density 52 of the conditioning media 40 proximate to the transition piece 30 connected downstream from the filter housing 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for conditioning air flow to a gas turbine, comprising:
   a. a filter housing that defines a cross-section for air flow;
   b. a conditioning media inside the filter housing that extends radially across the cross-section to adjust the temperature of the air flowing through the filter housing;
   c. a depth of the conditioning media;
   d. a density of the conditioning media;
   e. wherein at least one of the depth or the density of the conditioning media varies across the cross-section of the filter housing to reduce a temperature difference of the air flow across the cross-section of the filter housing.

2. The system as in claim 1, wherein the depth of the conditioning media increases substantially linearly across the cross-section of the filter housing.

3. The system as in claim 1, wherein the depth of the conditioning media increases greater than substantially linearly across the cross-section of the filter housing.

4. The system as in claim 1, wherein the depth of the conditioning media increases in step changes across the cross-section of the filter housing.

5. The system as in claim 1, wherein the density of the conditioning media increases substantially linearly across the cross-section of the filter housing.

6. The system as in claim 1, wherein the density of the conditioning media increases in step changes across the cross-section of the filter housing.

7. The system as in claim 1, further comprising a transition piece connected to the filter housing downstream from the conditioning media, wherein at least one of the depth or the density of the conditioning media increases proximate to the transition piece.

8. A system for conditioning air flow to a gas turbine, comprising:
   a. a filter housing that defines a path for air flow to the gas turbine;
   b. an inlet to the filter housing, wherein the inlet defines a first cross-section for air flow into the filter housing;
   c. an outlet to the filter housing downstream from the inlet, wherein the outlet defines a second cross-section for air flow out of the filter housing, wherein the second cross-section is smaller than the first cross-section;
   d. a conditioning media that extends radially across the filter housing between the inlet and the outlet to adjust the temperature of the air flowing from the inlet to the outlet;
   e. a depth of the conditioning media;
   f. a density of the conditioning media;
   g. wherein at least one of the depth or the density of the conditioning media varies across the filter housing to reduce a temperature difference of the air flow across the second cross-section of the filter housing.

9. The system as in claim 8, wherein the depth of the conditioning media increases substantially linearly across the filter housing.

10. The system as in claim 8, wherein the depth of the conditioning media increases greater than substantially linearly across the filter housing.

11. The system as in claim 8, wherein the depth of the conditioning media increases in step changes across the filter housing.

12. The system as in claim 8, wherein the density of the conditioning media increases substantially linearly across the filter housing.

13. The system as in claim 8, wherein the density of the conditioning media increases in step changes across the filter housing.

14. The system as in claim 8, further comprising a transition piece connected to the outlet downstream from the conditioning media, wherein at least one of the depth or the density of the conditioning media increases proximate to the transition piece.

15. A method for conditioning air flow to a gas turbine, comprising:
   a. flowing air through a filter housing connected to the gas turbine; and
   b. flowing the air across at least one of a varying depth or a varying density of a conditioning media in the filter housing;

c. conditioning the air flow to reduce the temperature difference of the air exiting the filter housing across a dimension of the filter housing.

16. The method as in claim 15, further comprising producing a desired temperature profile of the air flow to the gas turbine.

17. The method as in claim 15, further comprising increasing the depth of the conditioning media across the filter housing.

18. The method as in claim 15, further comprising increasing the depth of the conditioning media substantially linearly across the filter housing.

19. The method as in claim 15, further comprising increasing the density of the conditioning media across the filter housing.

20. The method as in claim 15, further comprising increasing the density of the conditioning media substantially linearly across the filter housing.

\* \* \* \* \*